United States Patent
Ohki et al.

(10) Patent No.: US 12,115,854 B2
(45) Date of Patent: Oct. 15, 2024

(54) DISPLAY DEVICE

(71) Applicants: TOYOTA JIDOSHA KABUSHIKI KAISHA, Toyota (JP); SUBARU CORPORATION, Tokyo (JP)

(72) Inventors: Shohei Ohki, Nagoya (JP); Naoya Kidokoro, Tokyo (JP); Taichi Kishida, Tokyo (JP); Shinnosuke Sakata, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 338 days.

(21) Appl. No.: 17/482,670

(22) Filed: Sep. 23, 2021

(65) Prior Publication Data
US 2022/0097523 A1 Mar. 31, 2022

(30) Foreign Application Priority Data
Sep. 25, 2020 (JP) .................... 2020-161375

(51) Int. Cl.
*B60K 35/00* (2024.01)
*B60K 35/22* (2024.01)
(Continued)

(52) U.S. Cl.
CPC .............. *B60K 35/00* (2013.01); *B60L 58/12* (2019.02); *G06F 3/147* (2013.01); *B60K 35/22* (2024.01);
(Continued)

(58) Field of Classification Search
CPC .............. B60K 35/00; B60K 2370/152; B60K 2370/169; B60L 58/12; G06F 3/147
See application file for complete search history.

(56) References Cited

U.S. PATENT DOCUMENTS

2012/0116606 A1 5/2012 Ichinokawa
2014/0142836 A1 5/2014 Yabuta
(Continued)

FOREIGN PATENT DOCUMENTS

CN 104442825 A 3/2015
CN 105216644 A 1/2016
(Continued)

OTHER PUBLICATIONS

Machine translation of JP4655007B2 downloaded from IP.com Mar. 5, 2024 (Year: 2024).*

(Continued)

*Primary Examiner* — Peter D Nolan
*Assistant Examiner* — Tanya C Sienko
(74) *Attorney, Agent, or Firm* — Oliff PLC

(57) ABSTRACT

A display device includes an acquisition unit that acquires an estimated cruising range obtained using remaining charge of a battery that supplies electric power to a traction motor of a vehicle, a first display portion that displays a gauge that, with regard to an electric mileage difference between a specific electric mileage that is an electric mileage at a particular timing during traveling of the vehicle and a reference electric mileage, changes in accordance with change in a cumulative value in which the electric mileage difference at one or more of the particular timing is accumulated, a second display portion that displays the estimated cruising range of the vehicle, and a display control unit that changes the gauge of the first display portion, and when the cumulative value is equal to or more than a predetermined value, displays, in the second display portion, information indicating increasing the estimated cruising range.

4 Claims, 4 Drawing Sheets

(51) Int. Cl.
  *B60K 35/28* (2024.01)
  *B60L 58/12* (2019.01)
  *G06F 3/147* (2006.01)

(52) U.S. Cl.
  CPC ........ *B60K 35/28* (2024.01); *B60K 2360/169* (2024.01)

(56) References Cited

U.S. PATENT DOCUMENTS

| | | | |
|---|---|---|---|
| 2015/0100226 A1* | 4/2015 | Skaff | G07C 5/004 |
| 2017/0028852 A1* | 2/2017 | Skaff | B60K 35/00 |
| 2021/0039663 A1* | 2/2021 | Gohlke | B60W 50/10 |
| 2023/0160720 A1* | 5/2023 | Iida | G01C 21/00 |

FOREIGN PATENT DOCUMENTS

| | | | |
|---|---|---|---|
| CN | 110406427 A | 11/2019 | |
| JP | 2009-064254 A | 3/2009 | |
| JP | 2009-156132 A | 7/2009 | |
| JP | 4655007 B2 * | 3/2011 | ............ B60R 16/02 |
| JP | 2012-100474 A | 5/2012 | |
| JP | 2014-101103 A | 6/2014 | |
| WO | 2009/031021 A2 | 3/2009 | |

OTHER PUBLICATIONS

Y. Zhang, W. Wang, Y. Kobayashi and K. Shirai, "Remaining driving range estimation of electric vehicle," 2012 IEEE International Electric Vehicle Conference, Greenville, SC, USA, 2012, pp. 1-7 (Year: 2012).*

* cited by examiner

FIG. 1
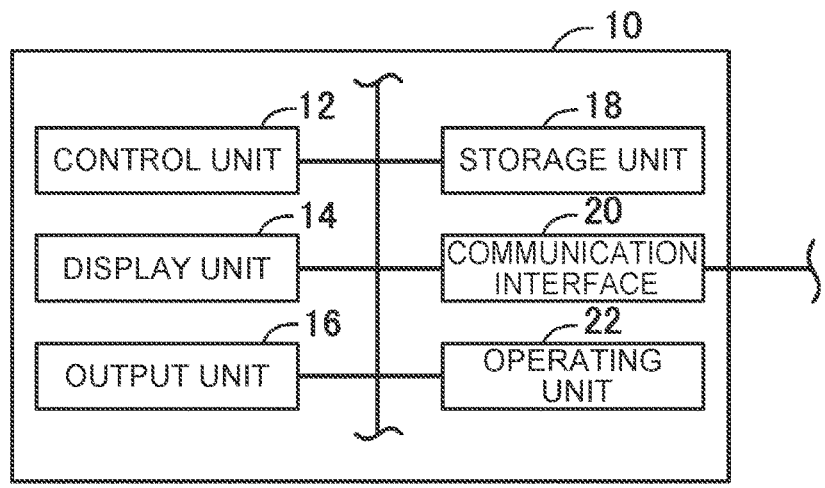
FIG. 2
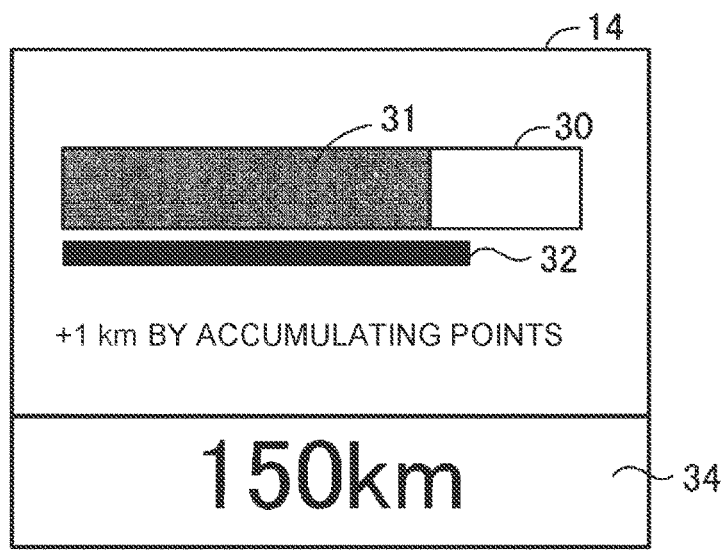
+1 km BY ACCUMULATING POINTS
150km
FIG. 3
| PROPERTIES INFORMATION | ELECTRIC- MILEAGE-RELATED INFORMATION |
|---|---|
| AAA | INFORMATION IN1 |
| BBB | INFORMATION IN2 |
| ⋮ | ⋮ |

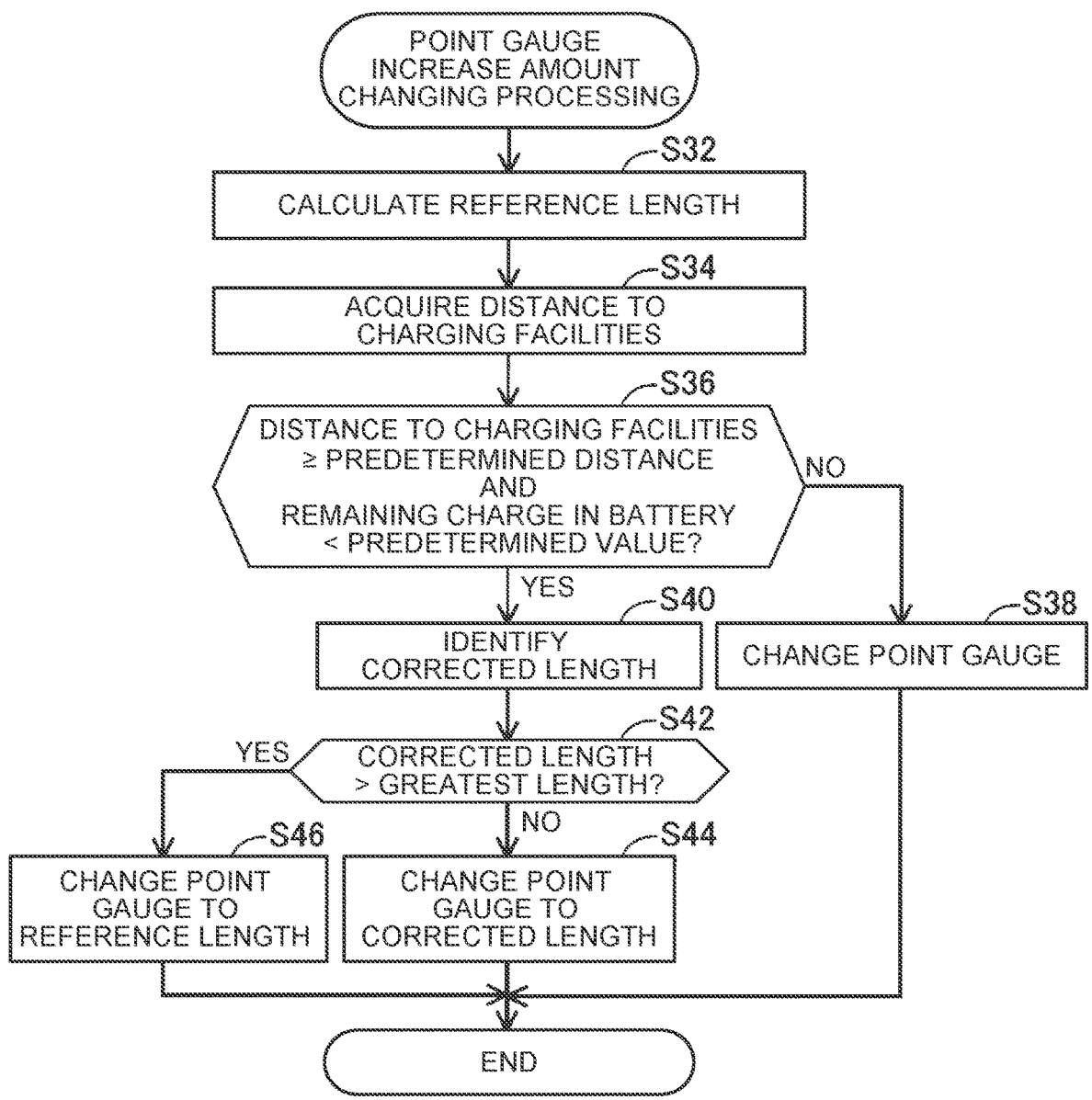

DISPLAY DEVICE

CROSS-REFERENCE TO RELATED APPLICATION

This application claims priority to Japanese Patent Application No. 2020-161375 filed on Sep. 25, 2020, incorporated herein by reference in its entirety.

BACKGROUND

1. Technical Field

The technology disclosed in the present specification relates to a display device installed in a vehicle that is provided with a battery for supplying electric power to a traction motor of the vehicle.

2. Description of Related Art

Japanese Unexamined Patent Application Publication No. 2014-101103 discloses technology for computing cruising range of a vehicle using specific power consumption (so-called electric mileage) obtained by dividing a traveling distance over a predetermined period by consumed electric power, and displaying the calculated cruising range.

SUMMARY

The cruising range changes due to the electric mileage changing in accordance with the traveling state of the vehicle. It is difficult for the driver to confirm how their own driving will affect the cruising range in the aforementioned technology. The present specification provides technology in which the driver can confirm change in cruising range.

An aspect of the disclosure relates to a display device including an acquisition unit configured to acquire an estimated cruising range obtained from remaining charge of a battery. The battery supplies electric power to a traction motor of a vehicle. A first display portion is configured to display a gauge that, with regard to an electric mileage difference between a specific electric mileage and a reference electric mileage, changes in accordance with a change in a cumulative value in which the electric mileage difference at one or more of the particular timing is accumulated. A second display portion is configured to display the estimated cruising range of the vehicle, and a vehicle. A display control unit is configured to change the gauge of the first display portion, and when the cumulative value is equal to or more than a predetermined value, display, in the second display portion, information indicating increasing the estimated cruising range displayed in the second display portion.

According to this configuration, the driver can tell the way in which the electric mileage difference between the specific electric mileage from their own driving and the reference electric mileage is accumulated, by confirming the first display portion. The driver can tell that the estimated cruising range increases by the cumulative value of the electric mileage difference exceeding a predetermined value, by confirming the second display portion. Accordingly, the driver can confirm change in the estimated cruising range from their own driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic block diagram of a display device according to an embodiment;

FIG. 2 is a frontal view of a display unit according to the embodiment;

FIG. 3 is a diagram showing an electric-mileage-related information database according to the embodiment;

FIG. 7 is a flowchart showing point gauge increase amount changing processing according to the embodiment.

DETAILED DESCRIPTION OF EMBODIMENTS

Figure 4:
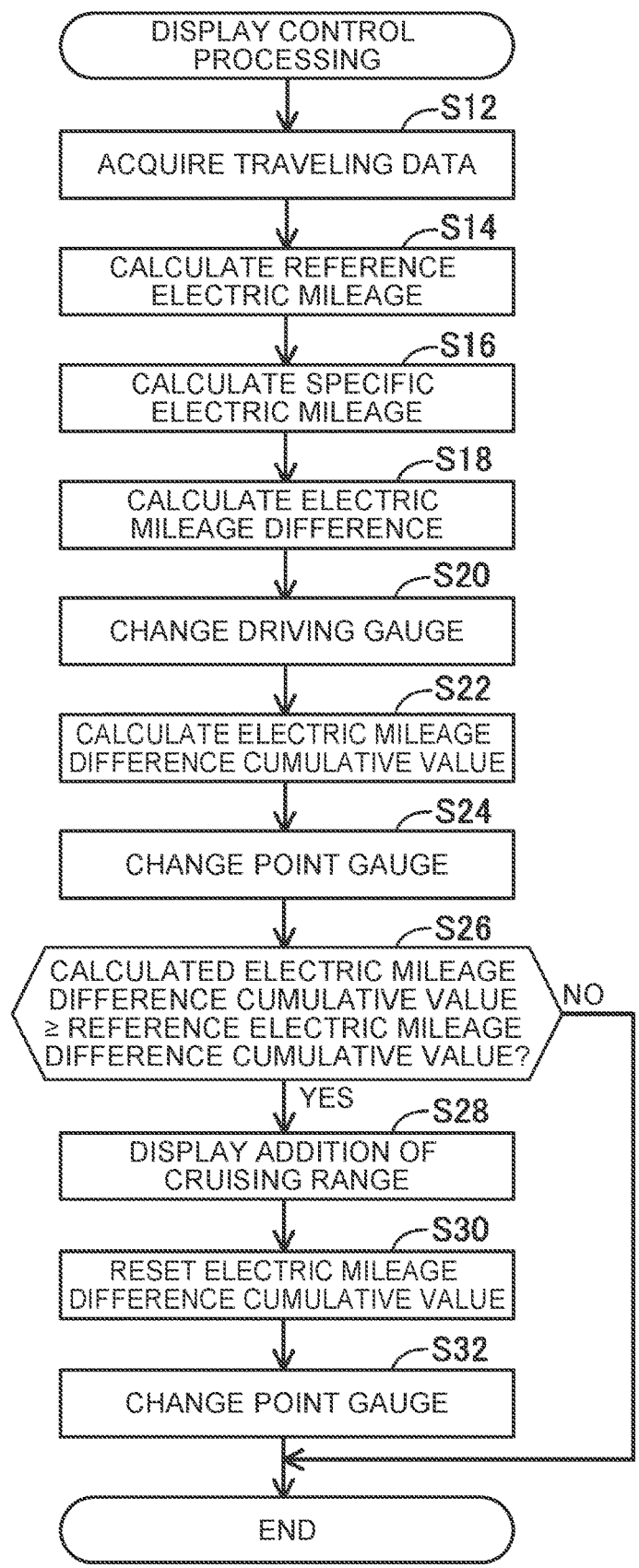
FIG. 4 is a flowchart showing display control processing according to the embodiment.

Technical elements of a display device disclosed in the present specification are listed below. Note that the following technical elements are each independently useful.

A display device according an example disclosed in the present specification may include a third display portion that displays a gauge that changes in accordance with change in the specific electric mileage. A display control unit may change the gauge of the third display portion. A first display portion and a second display portion and the third display portion may be displayed adjacently.

According to this configuration, the driver can visually recognize the first display portion and the second display portion and the third display portion that are adjacent, at the same time. Thus, the driver can visually recognize the specific electric mileage, the gauge corresponding to the cumulative value, and the cruising range, at the same time.

In a display device according an example disclosed in the present specification, the display control unit may set amounts of change of the gauge in the first display portion regarding change in the cumulative value in a particular case in which the electric mileage is to be suppressed in accordance with remaining charge in the battery, to be greater than amounts of change of the gauge in the first display portion regarding change in the cumulative value in a case other than the particular case.

According to this configuration, when electric mileage is to be suppressed in accordance with the remaining change of the battery, the driver can be promoted to perform driving that would further increase the gauge, i.e., power-conserving driving, due to the amounts of change of the gauge being increased.

A display device according an example disclosed in the present specification may further include an identifying unit that, when a particular driver drives the vehicle, identifies identification information of the particular driver, a storage unit that stores identification information of the particular driver and electric-mileage-related information relating to change in electric mileage while the particular driver is driving the vehicle, and an output unit that outputs information to the particular driver to reduce electric mileage, the information being obtained based on the electric-mileage-related information.

Driving habits, such as how to accelerate, how to decelerate, and so forth, for example, differ from one driver to another. Accordingly, electric mileage during driving differs depending on the driving habits of the driver. According to this configuration, the driver can acquire information for increasing electric mileage, in accordance with their own driving habits.

First Embodiment

A display device 10 according to a first embodiment will be described with reference to the drawings. The display device 10 is installed in a vehicle that drives wheels using torque of a driving motor. The vehicle is provided with a battery that supplies electric power to the driving motor. The cruising range of the vehicle, i.e., the distance that the vehicle is capable of traveling, changes in accordance with the remaining charge in the battery of the vehicle. Accordingly, the cruising range can be estimated using the remaining charge in the battery.

Configuration of Display Device 10

The display device 10 is provided with a control unit 12, a display unit 14, an output unit 16, a storage unit 18, a communication interface 20, and an operating unit 22, as illustrated in FIG. 1.

The control unit 12 includes a central processing unit (CPU), and memory such as random access memory (RAM), read-only memory (ROM), or the like. The control unit 12 is part of an electronic control unit (ECU) that controls the motor of the vehicle. The control unit 12 is communicably connected to each of the display unit 14, the output unit 16, the storage unit 18, the communication interface 20, and the operating unit 22, via a bus omitted from illustration. The control unit 12 executes various types of processing for controlling the display device 10. The control unit 12 controls the display unit 14, the output unit 16, and the storage unit 18 by executing various types of processing. The control unit 12 stores, in memory, computer programs for controlling the display unit 14, the output unit 16, the storage unit 18, the communication interface 20, and the operating unit 22. The control unit 12 executes various types of later-described processing by the CPU and the memory. Note that in a modification, the control unit 12 may be disposed separately from the ECU, and be communicably connected thereto by a cable or the like.

The display unit 14 is disposed at a position visible from a driver driving in the driver's seat. Specifically, the display unit 14 is disposed in tandem with a display device that displays vehicle speed. The display unit 14 is provided with a display screen such as a liquid crystal screen or the like. The display unit 14 displays images in accordance with signals supplied from the control unit 12.

The output unit 16 is provided with a speaker that emits audio into the vehicle cabin based on audio signals supplied from the control unit 12. In a modification, the output unit 16 may be provided with a display screen in the same way as with the display unit 14. The storage unit 18 is provided with a storage device for storing information such as memory or the like. The storage unit 18 stores information for the control unit 12 to execute various types of processing. Information stored in the storage unit 18 may include information stored in advance by the manufacturer and dealer of the vehicle at the time of shipping of the vehicle, and information acquired by processing executed by the control unit 12. Note that information in the storage unit 18 may be rewritable.

The communication interface 20 is communicably connected with other devices in the vehicle, such as, for example, a device that detects the remaining charge in the battery, and a device that detects vehicle speed. The communication interface 20 is also communicably connected to a wireless communication device such as an antenna and so forth installed in the vehicle, for executing communication via a mobile communication system that is a communication network of mobile terminals and the like, for example. Accordingly, the control unit 12 is capable of communicating externally from the display device 10 via the communication interface 20.

The operating unit 22 has various types of buttons for the driver to operate the display device 10. The operating unit 22 is provided with an operating button for the driver to store properties information representing properties of themselves (e.g., gender, age, name, etc.) in the storage unit 18. The operating unit 22 also is provided with a selection button for the driver to select properties information of themselves stored in the storage unit 18 at the time of starting to drive. As illustrated in an electric-mileage-related information database 40 shown in FIG. 3, the display device 10 is capable of storing properties information AAA, BBB, and so forth, of a plurality of drivers. Note that in a modification, the operating unit 22 may have a configuration in which the driver can operate the display device 10 by operating a display screen on the display unit 14, as with a touchscreen display, for example.

Configuration of Display Unit 14

The display unit 14 is provided with a driving gauge 30, a point gauge 32, and a cruising range display portion 34, as illustrated in FIG. 2. The driving gauge 30 displays the magnitude of electric mileage at the current point in time while the vehicle is traveling (hereinafter, referred to as "specific electric mileage"). A rectangular gauge 31 having the length in the right-left direction that corresponds to the magnitude of the specific electric mileage is displayed in the driving gauge 30. Note that the length of the rectangular gauge in the up-down direction is constant. As described later, the greater the value obtained by multiplying the electric mileage difference by "−1" is, the longer the gauge 31 in the driving gauge 30 is in the right-left direction.

The point gauge 32 is disposed adjacent to the driving gauge 30, directly below the driving gauge 30. The point gauge 32 is provided with a gauge that has an elongated display that increases as a period in which the specific electric mileage is relatively small is longer. A rectangular gauge that has a length in the right-left direction corresponding to a cumulative value of electric mileage is displayed in the point gauge 32. Note that the length of the rectangular gauge in the up-down direction is constant.

The cruising range display portion 34 is disposed adjacent to the point gauge 32, directly below the point gauge 32. The cruising range display portion 34 displays cruising range estimated from the remaining charge in the battery. The control unit 12 calculates the cruising range based on the remaining charge in the battery. The cruising range is the distance that the vehicle can travel without receiving supply of electric power to the battery from outside of the vehicle. The storage unit 18 stores cruising range in a case where the remaining charge in the battery is 100%, i.e., a case where the battery is fully charged. The control unit 12 calculates the cruising range by multiplying the cruising range when fully charged by the proportion of remaining charge in the battery. Note that the control unit 12 may calculate the cruising range taking into consideration the traveling state of the vehicle (e.g., vehicle speed at current point in time, electric power consumed by the air conditioner, etc.). The control unit 12 supplies signals representing the calculated cruising range to the display unit 14. The display unit 14 displays the cruising range expressed by the signals.

Display Control Processing

Next, display control processing that the control unit 12 executes will be described with reference to FIG. 4. After the power of the vehicle has been switched from off to on, the control unit 12 executes the display control processing periodically as long as the power is on. The control unit 12 executes display control processing at a timing to calculate specific electric mileage (e.g., once per second), for example. In the display control processing, the control unit 12 acquires traveling data representing the traveling state of the vehicle, from the devices installed in the vehicle and the storage unit 18, via the communication interface 20, in S12. Specifically, the control unit 12 acquires the traveling distance and the electric power consumed during a specific period between the current point in time and a predetermined point in time immediately before (e.g., one second before), and the traveling distance and the electric power consumed from starting the vehicle to the current point in time. Note that the control unit 12 cumulatively stores the traveling distance and the electric power consumed during the specific period acquired in S12 in the storage unit 18. Thus, the control unit 12 is able to acquire the traveling distance and the electric power consumed from starting the vehicle to the current point in time, by acquiring the traveling distance and the electric power consumed during a plurality of specific periods cumulatively stored, from the storage unit 18. Note that the traveling distance and the electric power consumed cumulatively in the specific periods, which have been stored in the storage unit 18, may be deleted when the power of the vehicle is switched from on to off.

Next, in S14, the control unit 12 calculates a reference electric mileage, and stores the calculated reference electric mileage in the storage unit 18. The reference electric mileage is calculated by dividing the traveling distance from the power of the vehicle being switched from off to on to the current point in time, which is already acquired in S12, by the electric power consumed from the power of the vehicle being switched from off to on to the current point in time. Next, in S16, the control unit 12 calculates the electric mileage in a specific period. The electric mileage calculated in S16 is specific electric mileage. Specifically, the control unit 12 divides the traveling distance in the specific period already acquired in S12 by the electric power consumed during the specific period, thereby calculating the specific electric mileage.

Next, in S18, the control unit 12 calculates electric mileage difference, and stores the calculated electric mileage difference in the storage unit 18. The control unit 12 calculates the electric mileage difference by subtracting the specific electric mileage already calculated in S16 from the reference electric mileage already calculated in S14. In S20, the control unit 12 changes the driving gauge 30. Specifically, the control unit 12 supplies the display unit 14 with a signal indicating the magnitude of a value obtained by multiplying the electric mileage difference already calculated in S18 by "−1". Upon acquiring the signal from the control unit 12, the display unit 14 displays a gauge of a length corresponding to the magnitude of the value obtained by multiplying the electric mileage difference by "−1" in the driving gauge 30. The greater the value obtained by multiplying the electric mileage difference by "−1" is, the longer the length of the gauge 31 displayed in the driving gauge 30 in the right-left direction is. Note that when the value obtained by multiplying the electric mileage difference by "−1" is a negative value, i.e., when the specific electric mileage is smaller than the reference electric mileage, the gauge 31 displayed in the driving gauge 30 may be a minimal length (e.g., no display of the gauge 31), regardless of the value obtained by multiplying the electric mileage difference by "−1".

According to this configuration, the control unit 12 can change the driving gauge 30 each time the specific electric mileage is calculated (e.g., once per second). Accordingly, the driver can confirm whether their own driving state at the current point in time is driving that conserves electric mileage. As a result, power-conserving driving by the driver can be promoted.

Next, in S22, the control unit 12 calculates and stores in the storage unit 18 an electric mileage difference cumulative value. Specifically, the control unit 12 adds a value, obtained by multiplying the electric mileage difference already calculated in S18 in the display control processing this time by "−1", to the electric mileage difference cumulative value already calculated in S22 in the previous display control processing. By multiplying the electric mileage difference by "−1", the greater the specific electric mileage is, the greater the value added to the electric mileage difference cumulative value is. The greater the value of the electric mileage difference cumulative value is, the more electric power consumption being suppressed in the state of driving the vehicle is represented.

Figure 5:
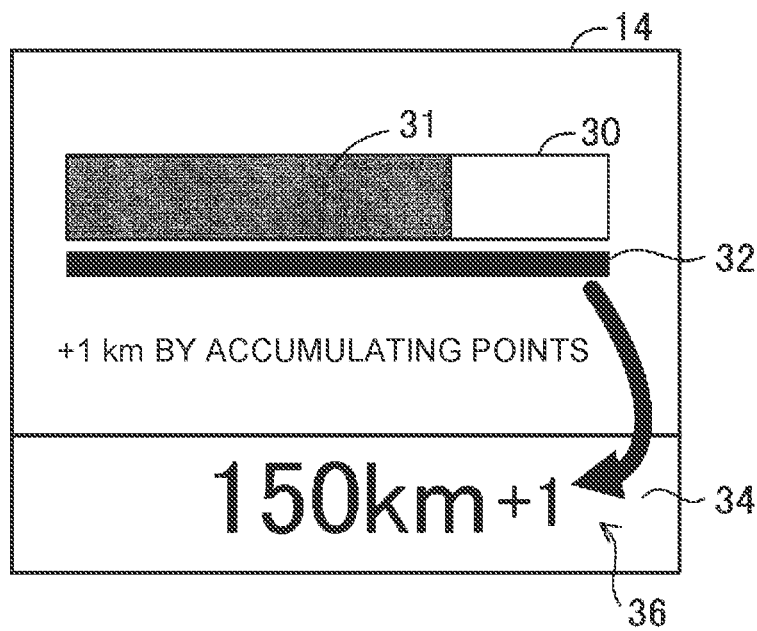
FIG. 5 is a frontal view showing change of the display unit according to the embodiment.

Next, in S24, the control unit 12 changes the point gauge 32. Specifically, the control unit 12 identifies the length of the point gauge 32 corresponding to the electric mileage difference cumulative value. A reference electric mileage difference cumulative value for extending the cruising range by 1 km is stored in the storage unit 18 in advance. The control unit 12 calculates the proportion of the electric mileage difference cumulative value already calculated in S22, as to the reference electric mileage difference cumulative value. When the electric mileage difference cumulative value is equal to or more than the reference electric mileage difference cumulative value, i.e., when the proportion of the electric mileage difference cumulative value already calculated in S22 as to the reference electric mileage difference cumulative value is equal to or more than 1.0, the point gauge 32 is displayed at the greatest length, as illustrated in FIG. 5. The control unit 12 calculates the length of the point gauge 32 corresponding to the electric mileage difference cumulative value already calculated in S22, by multiplying the greatest length by the proportion of the electric mileage difference cumulative value already calculated in S22 as to the reference electric mileage difference cumulative value calculated in S24.

Next, the control unit 12 determines whether the length of the point gauge 32 corresponding to the electric mileage difference cumulative value already calculated in S22 is longer than the length of the gauge currently displayed in the point gauge 32. When the length of the point gauge 32 corresponding to the electric mileage difference cumulative value already calculated in S22 is longer than the length of the gauge currently displayed in the point gauge 32, the control unit 12 displays the point gauge 32 of the already-calculated length on the display unit 14. On the other hand, when the length of the point gauge 32 corresponding to the electric mileage difference cumulative value already calculated in S22 is not longer than the length of the gauge currently displayed in the point gauge 32, the control unit 12 does not change the length of the point gauge 32.

Next, in S26, the control unit 12 determines whether the electric mileage difference cumulative value already calculated in S22 is equal to or more than the reference electric mileage difference cumulative value. In a modification, the control unit 12 may determine in S26 whether the proportion of the electric mileage difference cumulative value already calculated in S22 as to the reference electric mileage difference cumulative value already calculated in S24 is equal to or more than 1.0. When the electric mileage difference cumulative value already calculated in S22 is smaller than the reference electric mileage difference cumulative value (NO in S26) (when the proportion of the electric mileage difference cumulative value already calculated in S22 as to the reference electric mileage difference cumulative value already calculated in S24 is less than 1.0 in a modification), the display control processing ends.

On the other hand, when the electric mileage difference cumulative value already calculated in S22 is equal to or more than the reference electric mileage difference cumulative value (YES in S26) (when the proportion of the electric mileage difference cumulative value already calculated in S22 as to the reference electric mileage difference cumulative value already calculated in S24 is equal to or more than 1.0 in a modification), in S28 the control unit 12 supplies image data to the display unit 14 indicating that 1 km will be added to the cruising range. The image data supplied in S28 is stored in the storage unit 18 in advance. As illustrated in FIG. 5, the display unit 14 displays an image 36 represented by the image data supplied from the control unit 12. Thus, the driver can easily comprehend that the cruising range has been extended by their own driving. This can prompt the driver to make a habit of power-conserving driving.

Figure 6:
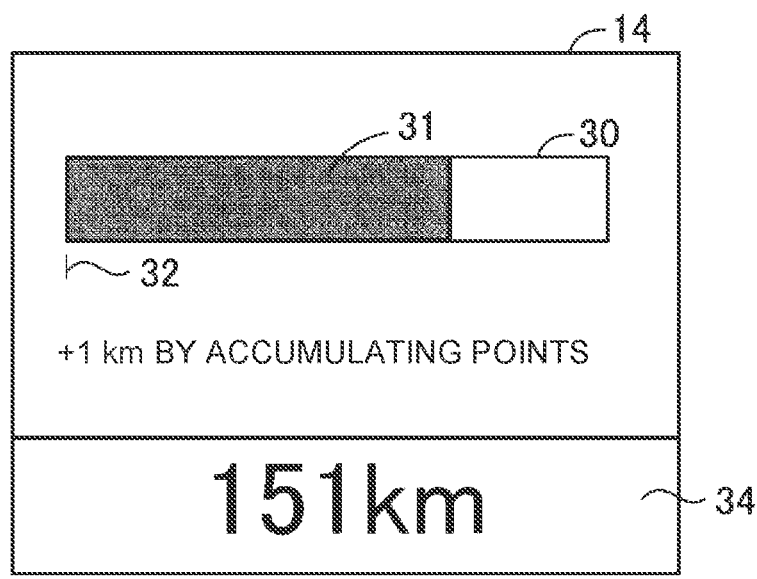
FIG. 6 is a frontal view showing change of the display unit according to the embodiment.

Next, in S30, the control unit 12 resets the electric mileage difference cumulative value stored in the storage unit 18 to "0". Subsequently, in S32, the control unit 12 changes the length of the gauge of the point gauge 32 to the smallest length, and controls the display unit 14 to add "1" to the cruising range displayed on the cruising range display portion 34. Thus, the point gauge 32 is changed to the smallest length on the display unit 14 (i.e., the point gauge 32 is not displayed), and the cruising range displayed on the cruising range display portion 34 is incremented by 1 km, as illustrated in FIG. 6. When the processing of S32 ends, the display control processing ends.

With the display device 10, the driver can tell the way in which the electric mileage difference between the specific electric mileage from their own driving and the reference electric mileage is accumulated, by confirming the point gauge 32. The driver can tell the increase in cruising range when the cumulative value of the electric mileage difference exceeds a predetermined value, by confirming the cruising range display portion 34. Thus, the driver can confirm change in cruising range due to their own driving.

By visually recognizing the display unit 14, the driver can confirm the driving gauge 30, the point gauge 32, and the cruising range display portion 34, which are adjacent to each other, at the same time. Thus, the driver can tell the specific electric mileage, the electric mileage cumulative value, and the cruising range, at the same time.

When the length of the point gauge 32 corresponding to the electric mileage difference cumulative value already calculated in S22 is not longer than the length of the gauge currently displayed in the point gauge 32, the control unit 12 does not change the length of the point gauge 32. In this configuration, the point gauge 32, which can serve as a determination reference regarding whether power-conserving driving is being performed, is kept from becoming shorter. According to this configuration, a situation in which the driver loses motivation to perform power-conserving driving due to the point gauge 32 becoming shorter can be suppressed.

Order Deciding Processing

Next, order deciding processing that the display device 10 executes will be described. The control unit 12 transmits a potential difference cumulative value, along with vehicle identification information, to a server installed by the manufacturer of the vehicle, for example, via the communication interface 20. Identification information of the vehicle is information uniquely imparted to the vehicle. The identification information is stored in the storage unit 18 in advance, by the manufacturer of the vehicle, or the like. The identification information of the vehicle includes information for identifying the model of the vehicle. The server combines and stores the already-received potential difference cumulative value and identification information of the vehicle. The server can receive and store, from display devices 10 of one or more other vehicles, the already-received potential difference cumulative value and identification information of the vehicle, in the same way.

The server decides an order in order of magnitude of the potential difference cumulative value for vehicles of the same model, using the already-stored identification information of the one or more vehicles, and transmits the already-decided order to each of the one or more vehicles of the identification information. When the already-decided order is received from the server, the control unit 12 displays the already-received order on the display unit 14. The display unit 14 displays the already-received order at a position adjacent to the cruising range display portion 34. Thus, the driver can compare how power-conserving their own driving is, as to other vehicles of the same model. Thus, driver can be prompted to perform power-conserving driving.

Driving Advice Processing

Next, driving advice processing that the display device 10 executes will be described. When the selection button of the operating unit 22 is operated, and a particular properties information out of the one or more of properties information already stored in the storage unit 18 is selected, the control unit 12 cumulatively stores the specific electric mileage calculated in S16 of the display control processing in the storage unit 18 following selection of the properties information. Accordingly, the properties information AAA and BBB, and electric-mileage-related information IN1 and IN2 in which specific electric mileage is cumulatively stored, are stored to be combined, as illustrated in FIG. 3.

Also, when the selection button of the operating unit 22 is operated, and particular properties information out of the one or more pieces of properties information stored in the storage unit 18 is selected, the control unit 12 identifies electric-mileage-related information stored in combination with the particular properties information, and outputs advice information for increasing electric mileage to the output unit 16, based on the identified electric-mileage-related information. Combinations of a plurality of pieces of advice information and characteristics information representing characteristics of electric-mileage-related information are stored in the storage unit 18 in advance by the manufacturer of the vehicle, for example.

The control unit 12 identifies characteristics information corresponding to the already-identified electric-mileage-related information, from among the combinations of the pieces of advice information and the characteristics information. For example, when the range of the specific electric mileage included in the electric-mileage-related information matches characteristics information that the range is greater than a reference increase/decrease range identified in advance, the control unit 12 identifies advice information combined with this characteristics information, and supplies to the output unit 16. When the range of increase/decrease of the specific electric mileage is greater than the reference increase/decrease range identified in advance, frequent rapid acceleration of the vehicle can be assumed, and advice information prompting to suppress rapid acceleration of the vehicle, for example, is output. According to this configuration, by outputting advice information for suppressing the deterioration of electric mileage, the display device 10 can propose driving that is power-conserving, i.e., driving that readily increases the point gauge 32, to the driver. Driving habits, such as how to accelerate, how to decelerate, and so forth, for example, differ from one driver to another. Accordingly, electric mileage during driving differs depending on the driving habits of the driver. According to this configuration, the driver can acquire information for increasing electric mileage, in accordance with their own driving habits.

Note that the control unit 12 may acquire driving habits of the driver from various devices in the vehicle, such as throttle valve opening degree, the number of times of braking, and so forth, via the communication interface 20. In this case, the control unit 12 may output optimal advice information from a plurality of pieces of advice information that are already stored, in accordance with driving habits. For example, when the number of times of braking is greater than a reference number of times stored in the storage unit 18 in advance, advice information to suppress the number of times of braking may be output.

Second Embodiment

In the first embodiment, the length of the point gauge 32 corresponding to the electric mileage difference cumulative value already calculated in S22 is calculated in S24 of the display control processing, by multiplying the greatest length by the proportion of the electric mileage difference cumulative value already calculated in S22 as to the reference electric mileage difference cumulative value calculated in S24. In a second embodiment, the calculation method of the length of the point gauge 32 in S24 differs. That is to say, in S24, the control unit 12 changes the calculation method for the length of the point gauge 32 under a situation in which electric mileage should be suppressed in accordance with the remaining charge in the battery.

Specifically, in S24, the control unit 12 executes point gauge increase amount changing processing illustrated in FIG. 7. In the point gauge increase amount changing processing, first, in S32, the control unit 12 calculates the length of the point gauge 32 corresponding to the electric mileage difference cumulative value already calculated in S22 (hereinafter referred to as "reference length"). Next, in S34, the control unit 12 acquires the distance from the vehicle to the closest facility where charging can be performed, from a navigation system installed in the vehicle. In the following S36, the control unit 12 determines whether the already-acquired distance to the facility where charging can be performed is equal to or more than a predetermined distance (e.g., 50 km), and also whether the remaining charge of the battery already acquired in S12 is below a predetermined value. When the already-acquired distance to the facility where charging can be performed is less than a predetermined distance (e.g., 50 km), or the remaining charge of the battery already acquired in S12 is equal to or more than a predetermined value (NO in S36), in S38 the control unit 12 identifies the reference length as being the length of the point gauge 32, changes the point gauge 32, and ends the point gauge increase amount changing processing, i.e., the processing of S24.

On the other hand, when the already-acquired distance to the facility where charging can be performed is equal to or more than the predetermined distance, and the remaining charge of the battery already acquired in S12 is below the predetermined value (YES in S36), in S40 the control unit 12 increases the reference length by a predetermined proportion (e.g., 20%), and calculates the length of the point gauge 32 (hereinafter referred to as "corrected length"). Next, in S42, the control unit 12 determines whether the corrected length exceeds the greatest length of the point gauge 32. When the corrected length does not exceed the greatest length of the point gauge 32 (NO in S42), in S44 the control unit 12 identifies the corrected length to be the length of the point gauge 32, changes the point gauge 32, and ends the point gauge increase amount changing processing, i.e., the processing of S24.

On the other hand, when the corrected length exceeds the greatest length of the point gauge 32 (YES in S42), in S46 the control unit 12 identifies the reference length to be the length of the point gauge 32, changes the point gauge 32, and ends the point gauge increase amount changing processing, i.e., the processing of S24. Thus, when electric mileage should be suppressed in accordance with the remaining charge in the battery, i.e., when YES in S36, the amount of change of the point gauge 32 can be made to be larger than when electric mileage should not be suppressed in accordance with the remaining charge in the battery. As a result, due to the amount of change of the point gauge 32 being increased, the driver can be promoted to perform driving that would further increase the point gauge 32, i.e., power-conserving driving.

Modifications

The vehicle may be provided with a driving engine besides the driving motor. In this case, the cruising range may be estimated using the remaining charge in the battery. Alternatively, the cruising range may be estimated using the remaining charge in the battery and the remaining amount of fuel.

In the above embodiments, the reference electric mileage is calculated in S14. However, the reference electric mileage may be stored in the storage unit 18 in advance, by the manufacturer of the vehicle or the like. Alternatively, the control unit 12 may receive the reference electric mileage externally via the communication interface 20, from a server or the like provided by the manufacturer of the vehicle or the like, for example.

The display unit 14 does not have to be provided with the driving gauge 30. Also, it is sufficient for at least the point gauge 32 and the cruising range display portion 34 to be disposed adjacently on the display unit 14. In this case, the point gauge 32 and the cruising range display portion 34 may be disposed to be arrayed in the right-left direction. It is sufficient for the driving gauge 30 to be disposed adjacent to the point gauge 32 and the cruising range display portion 34, and may be disposed adjacent in the right-left direction as to the point gauge 32 and the cruising range display portion 34 that are arrayed in the up-down direction.

Technical elements described in the present specification or the drawings exhibit technical utility, either singularly or through various types of combinations, and do not limit combinations set forth in the specification. Also, the technology exemplified in the present specification or the drawings may achieve a plurality of objects simultaneously, and achieving one of these objects in itself has technical utility.

What is claimed is:

1. A display device, comprising:
    a first display portion configured to display a first gauge that, with regard to an electric mileage difference between a specific electric mileage and a reference electric mileage, change in accordance with change in a cumulative value in which the electric mileage difference at one or more of a particular timing is accumulated;
    a second display portion configured to display an estimated cruising range of a vehicle; and
    a memory and processor programmed to:
        calculate the specific electric mileage as an instantaneous electric mileage calculated based on a set interval previous to a current point in time;
        calculate the reference electric mileage by dividing a traveling distance from a time a power of the vehicle has been switched from off to on to the current point in time, divided by a cumulative electric power consumed by the vehicle from the time the power of the vehicle being has been switched from off to on to the current point in time;
        acquire the estimated cruising range obtained using remaining charge of a battery that supplies electric power to a traction motor of the vehicle;
        change the first gauge of the first display portion, such that only when the cumulative value is equal to or more than a predetermined value, display, in the second display portion, information indicating increasing the estimated cruising range displayed in the second display portion.

2. The display device according to claim 1, further comprising a third display portion configured to display a second gauge that changes in accordance with change in the specific electric mileage, wherein:
    the memory and processor are programmed to further change the second gauge of the third display portion; and
    the first display portion, the second display portion and the third display portion are displayed adjacently.

3. The display device according to claim 1, wherein the memory and processor are programmed to set amounts of change of the first gauge in the first display portion regarding change in the cumulative value in a particular case in which the electric mileage is to be suppressed in accordance with remaining charge in the battery, to be greater than amounts of change of the first gauge in the first display portion regarding change in the cumulative value in a case other than the particular case.

4. A display device, comprising:
    a first display portion configured to display a first gauge that, with regard to an electric mileage difference between a specific electric mileage and a reference electric mileage, change in accordance with change in a cumulative value in which the electric mileage difference at one or more of a particular timing is accumulated;
    a second display portion configured to display an estimated cruising range of a vehicle; and
    a memory and processor programmed to:
        calculate the specific electric mileage as an instantaneous electric mileage calculated based on a set interval previous to a current point in time;
        calculate the reference electric mileage by dividing a traveling distance from a time a power of the vehicle has been switched from off to on to the current point in time, divided by a cumulative electric power consumed by the vehicle from the time the power of the vehicle being has been switched from off to on to the current point in time;
        acquire the estimated cruising range obtained using remaining charge of a battery that supplies electric power to a traction motor of the vehicle;
        change the first gauge of the first display portion, and when the cumulative value is equal to or more than a predetermined value, display, in the second display portion, information indicating increasing the estimated cruising range displayed in the second display portion;
        identify when a particular driver drives the vehicle, and obtain identify identification information of the particular driver;
        store the identification information of the particular driver, and electric-mileage-related information relating to change in electric mileage while the particular driver is driving the vehicle; and
        output advisory information based on driver data of the particular driver to increase electric mileage, the advisory information being obtained based on the electric-mileage-related information.

* * * * *